(12) United States Patent
Moriguchi et al.

(10) Patent No.: US 8,160,762 B2
(45) Date of Patent: Apr. 17, 2012

(54) AUTONOMOUS MOVING APPARATUS

(75) Inventors: Toshiki Moriguchi, Kyoto (JP);
Takahiko Murayama, Kyoto (JP);
Takuya Okada, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 461 days.

(21) Appl. No.: 12/474,362

(22) Filed: May 29, 2009

(65) Prior Publication Data

US 2010/0049388 A1   Feb. 25, 2010

(30) Foreign Application Priority Data

Aug. 22, 2008 (JP) .................. 2008-214636
Nov. 20, 2008 (JP) .................. 2008-296286

(51) Int. Cl.
*G05D 3/00* (2006.01)
(52) U.S. Cl. ....... 701/22; 701/29.2; 701/33.8; 701/34.4; 701/36
(58) Field of Classification Search .................. 701/22, 701/23, 29, 33, 34, 36, 29.2, 33.8, 34.4; 362/464; 455/345, 347, 100, 575.8
See application file for complete search history.

(56) References Cited

U.S. PATENT DOCUMENTS

2008/0259618 A1 * 10/2008 Tyll et al. .................... 362/464

FOREIGN PATENT DOCUMENTS

| JP | 08-194538 A | 7/1996 |
| JP | 08-263137 A | 10/1996 |
| JP | 2006-021267 A | 1/2006 |

* cited by examiner

*Primary Examiner* — Gertrude Arthur Jeanglaude
(74) *Attorney, Agent, or Firm* — Keating & Bennett, LLP

(57) ABSTRACT

An autonomous moving apparatus includes a vehicle provided with a drive unit; a cover that is attached to the vehicle such that the cover either entirely or partially covers side, upper, and lower surfaces of the vehicle, and the cover is arranged to be displaced with respect to the vehicle; a detection unit arranged to output detection signals in accordance with relative displacement generated between at least one of the upper and lower surfaces of the vehicle and the cover facing at least one of the upper and lower surfaces; and a control unit arranged to control the drive unit in accordance with the detection signals output from the detection unit.

7 Claims, 10 Drawing Sheets

AUTONOMOUS MOVING APPARATUS

CROSS-REFERENCE TO RELATED APPLICATIONS

This application claims priority under 35 U.S.C. 119 to Japanese Patent Applications No. 2008-214636, filed on Aug. 22, 2008, and No. 2008-296286, filed on Nov. 20, 2008, which applications are hereby incorporated by reference in their entirety.

BACKGROUND OF THE INVENTION

1. Field of the Invention

The present invention relates to an autonomous moving apparatus and, in particular, to an autonomous moving apparatus that detects contacts with obstacles or the like while moving.

2. Description of the Related Art

An autonomous traveling vehicle that travels autonomously while detecting obstacles or the like has been researched and developed, and such a vehicle has been put into practical use as a transfer robot in warehouses and factories, for example. Such an autonomous traveling vehicle is disclosed in conventional arts as follows.

A conventional autonomous traveling vehicle can detect contacts with obstacles, or the like, with respect to all directions of a vehicle body. The autonomous traveling vehicle includes a rectangular vehicle body base plate and a box-shaped external cover arranged to cover the base plate. The vehicle body base plate and the external cover are connected with each other by a plurality of external cover connecting members. Eight micro switches provided to detect displacement of the external cover are arranged between a side portion of the vehicle body base plate and an inner surface of the external cover. When contacted by an obstacle, or the like, and resultantly acted on by external forces, the external cover moves horizontally, and the micro switch that is arranged in the vicinity of a contacted portion from among the eight micro switches is turned on. Thus, the contact of the autonomous traveling vehicle with the obstacle can be detected.

A conventional obstacle detecting device of an unmanned transfer vehicle including a movable bumper surrounding an unmanned transfer vehicle main body and a sensor arranged to detect the movement of the bumper has the following configuration. The bumper of the unmanned transfer vehicle includes a main body frame arranged on a side surface of the unmanned transfer vehicle main body; elastic supporting members arranged at four corners of the main body frame; and a bumper frame that is suspended by or mounted on the elastic supporting members. The sensor of the obstacle detecting device includes a contact sensor arranged on an external side of the bumper frame; a proximity sensor arranged on an inner side of the bumper frame; and a proximity sensor arranged on an upper surface of the main body frame.

A conventional autonomous robot has the following configuration. The autonomous robot includes a main body that can travel by being driven and an exterior portion that extends along an entire circumference of the main body and is attached to the main body via a force sensor, thereby detecting collisions of the exterior portion with obstacles or the like based on outputs from the force sensor.

In the above conventional autonomous traveling vehicle, the eight micro switches are provided around an entire circumference of a side surface of the vehicle body in order to detect the contacts or collisions with respect to all directions (i.e., front, back, right, and left directions). As a result, the configuration of the autonomous traveling vehicle becomes complicated and costly, and the productivity and reliability of the autonomous traveling vehicle is decreased. Therefore, a technique that can detect the contacts or collisions with respect to all directions by fewer detection devices during the autonomous movement has been desired.

A similar problem can be found in the configuration of the above obstacle detecting device. That is, contacts with obstacles or the like cannot be detected by a tape switch (i.e., by the contact sensor) unless a detection surface of the tape switch makes contact with such obstacles. Therefore, the tape switch detects such contacts only when an obstacle or the like makes contact with a width portion of the tape, thereby resulting in local detections. Further, if a great number of tape switches are provided in order to evenly detect the contacts with respect to all directions, a manufacturing cost is increased. Furthermore, the proximity sensor of the obstacle detecting device can detect only the contacts in a horizontal direction, and accordingly, when the bumper moves obliquely in an upper direction, for example, the contacts with the obstacles may not be detected.

On the other hand, in the configuration of the autonomous robot, the collisions with the obstacles can be determined by detecting, through the force sensor, the moment generated on the exterior portion when the exterior portion collides with the obstacles. However, when compared with a binary sensor, which is turned on and off, the force sensor may be expensive, leaving room for improvement in view of manufacturing cost reduction.

SUMMARY OF THE INVENTION

Preferred embodiments of the present invention overcome the above problems, and accordingly, contacts or collisions with respect to all directions can be detected by fewer detection devices while an autonomous moving apparatus autonomously moves.

According to a preferred embodiment of the present invention, an autonomous moving apparatus preferably includes a vehicle provided with a drive unit; a cover that is attached to the vehicle such that the cover either entirely or partially covers side, upper, and lower surfaces of the vehicle and such that the cover can be displaced relative to the vehicle; a detection unit arranged to output a detection signal in accordance with a relative displacement generated between at least one of the upper and lower surfaces of the vehicle and the cover facing at least one of the upper and lower surfaces; and a control unit arranged to control the drive unit in accordance with the detection signal output from the detection unit.

In the above autonomous moving apparatus, the cover arranged to entirely or partially cover the side, upper, and lower surfaces of the vehicle provided with the drive unit is attached to the vehicle such that the cover can be displaced with respect to the vehicle. Accordingly, when the autonomous moving apparatus makes contact with an obstacle or the like, for example, the cover is displaced with respect to the vehicle by external forces applied to the autonomous moving apparatus. When the external forces are applied from any of front, back, right, and left directions of the autonomous moving apparatus, the relative displacement in a horizontal direction is generated between at least one of the upper and lower surfaces of the vehicle and the cover facing at least one of the upper and lower surfaces. Therefore, contact with the obstacle or the like can be detected in all directions by at least one detection unit arranged to detect the relative displacement generated between the upper and lower surfaces of the vehicle and the cover facing the upper and lower surfaces. Thus, the contact or collisions in all directions can be detected using fewer detection devices (detection units) when the drive unit is controlled to move autonomously.

According to a further preferred embodiment of the present invention, the cover is preferably attached to the vehicle via supporting members arranged to support the cover such that the cover can be displaced in accordance with externally-applied forces.

With the above configuration, when the autonomous moving apparatus makes contact with the obstacle or the like, for example, the cover is displaced with respect to the vehicle in accordance with the magnitude of the external forces applied to the cover of the autonomous moving apparatus. Therefore, detection results can be acquired with respect to the magnitude of forces acting on the autonomous moving apparatus (cover), i.e., based on the intensity of the contact with the obstacle or the like.

According to a further preferred embodiment of the present invention, the supporting members are arranged to support the cover such that the cover can be displaced in accordance with the externally-applied forces.

Thus, when the autonomous moving apparatus makes contact with the obstacle or the like, for example, the cover is displaced with respect to the vehicle in accordance with the magnitude of the external forces applied to the cover of the autonomous moving apparatus. Therefore, detection results that are proportional to the magnitude of the forces acted on the autonomous moving apparatus (cover), i.e., proportional to the intensity of the contact with the obstacle or the like can be acquired.

According to a further preferred embodiment of the present invention, the detection unit is arranged at a position that is offset from a rotational axis of the cover.

With the above arrangement, when the autonomous moving apparatus makes contact with the obstacle or the like, for example, even if the external forces are applied in a direction that causes the cover to rotate, the cover displacement, i.e., the contact with the obstacle or the like, can be detected.

According to a further preferred embodiment of the present invention, the drive unit preferably includes electric motors and wheels that are driven by the electric motors such that it can move in all the front, back, right, and left directions.

Accordingly, by driving the electric motors, the vehicle (the autonomous moving apparatus) can be moved in all of the front, back, right, and left directions.

According to a further preferred embodiment of the present invention, the detection unit preferably includes a detection body attached to an inner surface of the cover facing at least one of the upper and lower surfaces of the vehicle and a sensor arranged to contactlessly detect the absence or presence of the detection body.

When using the non-contact type detection unit, the displacement of the cover is not restricted by the resistance of the detection unit. Moreover, when adjusting an amount of displacement of the cover with respect to the external forces by changing the attenuation characteristics of the supporting members, for example, it is not necessary to consider the resistance of the detection unit, and thus the detection characteristics of the detection unit and the attenuation characteristics of the supporting members can be individually set.

According to a further preferred embodiment of the present invention, the autonomous moving apparatus preferably further includes an additional or second detection unit provided with detection characteristics that are different from that of the detection unit, or first detection unit, described above.

When the cover is displaced by a prescribed value, the first detection unit is turned on/off, and when the cover is displaced by a value that is greater than the prescribed value, the second detection unit is turned on/off. The control unit controls the drive unit in accordance with on/off signals that are output from both the first detection unit and the second detection unit.

Thus, the intensity of the contact can be detected in three separate stages (i.e., no contact, a slight contact, and an intense contact). Moreover, phased avoidance operations can be implemented in accordance with the magnitude (intensity) of the detected contact by controlling the drive unit in accordance with the magnitude (intensity) of the detected contact.

According to the above preferred embodiments of the present invention, the cover arranged to entirely or partially cover the side, upper, and lower surfaces of the vehicle is attached such that the cover can be displaced with respect to the vehicle, and the contact with the obstacle or the like is detected by sensing the relative displacement generated between the upper and lower surfaces of the vehicle and the cover facing the upper and lower surfaces. As a result, omni-directional contacts or collisions can be detected using fewer detection units at the time of autonomous movement.

According to another preferred embodiment of the present invention, an autonomous moving apparatus preferably includes a vehicle provided with a drive unit; a cover that is attached to the vehicle such that the cover either entirely or partially covers side, upper, and lower surfaces of the vehicle and that the cover can be displaced with respect to the vehicle; a detection unit that is arranged at a central portion of the vehicle and is arranged to output on/off detection signals when the cover is displaced with respect to the vehicle by a prescribed value; and a control unit arranged to control the drive unit in accordance with the detection signal output from the detection unit.

With the above configuration, when the autonomous moving apparatus makes contact with an obstacle or the like, for example, the cover is displaced with respect to the vehicle by external forces applied to the autonomous moving apparatus. By detecting the relative displacement with the detection unit arranged at the central portion of the vehicle, the displacement with respect to all directions of the cover can be evenly detected. As a result, it is not necessary to provide a detection unit for each direction on the assumption of omni-directional contacts with the obstacles, or the like, and the number of detection units can be reduced. Moreover, the omni-directional contacts or collisions can be detected by using a reasonable, simply-configured detection unit that can be turned on and off. Further, because the detection unit is preferably arranged at a central portion, a wiring arrangement or the like can be simplified, and the configuration used to detect the contacts and the collisions can also be simplified.

According to a further preferred embodiment of the present invention, the cover is preferably anteriorly-posteriorly symmetric and bilaterally symmetric across a portion where the detection unit is arranged.

Accordingly, since the cover is symmetric, a disproportion of the relative displacement amount can be reduced regardless of the portion where the cover has made contact with the obstacle or the like. As a result, the contacts and the collisions with respect to the autonomous moving apparatus can be evenly detected in all directions, thereby improving the detection accuracy.

A further preferred embodiment of the present invention provides a restriction unit arranged to restrict the movement in the upper direction of the cover with respect to the vehicle.

Thus, even when the obstacle or the like makes contact with the cover obliquely from a lower side, and when the cover is resultantly forced to move obliquely upward, the movement in the upper direction can be restricted by the restriction unit, and thus the amount of displacement of the cover in the horizontal direction can be sufficiently secured. Therefore, even when the obstacle or the like makes contact obliquely from the lower side, the detection unit can accurately detect the collision and the contact by detecting the horizontal movement of the cover.

According to a further preferred embodiment of the present invention, the cover is attached to the vehicle via supporting members arranged to support the cover such that the cover can be displaced in accordance with externally-applied forces.

Accordingly, when the autonomous moving apparatus makes contact with the obstacle or the like, the cover is displaced with respect to the vehicle in accordance with the magnitude of the external forces applied to the cover of the autonomous moving apparatus. Thus, situations where a collision is detected even though the impact of the contact made by the obstacle is small enough to be ignored or where the collision is not detected even though the impact of the contact made by the obstacle is great, for example, can be prevented, thereby implementing accurate detection by the detection unit in accordance with the impact.

According to a further preferred embodiment of the present invention, the autonomous moving apparatus preferably further includes an additional or second detection unit provided with detection characteristics that are different from that of the detection unit, or first detection unit, described above. The second detection unit outputs on/off detection signals when the cover is displaced with respect to the vehicle by a prescribed value that is different from that of the first detection unit. The control unit is arranged to control the drive unit in accordance with the on/off detection signals output from the first detection unit and the second detection unit.

Thus, the intensity of the contact can be detected in three stages (i.e., no contact, slight contact, and intense contact). By controlling the drive unit in accordance with the magnitude (intensity) of the detected contact, phased stop operations and avoidance operations, etc., can be controlled in accordance with the magnitude (intensity) of the detected contact.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Figure 1:
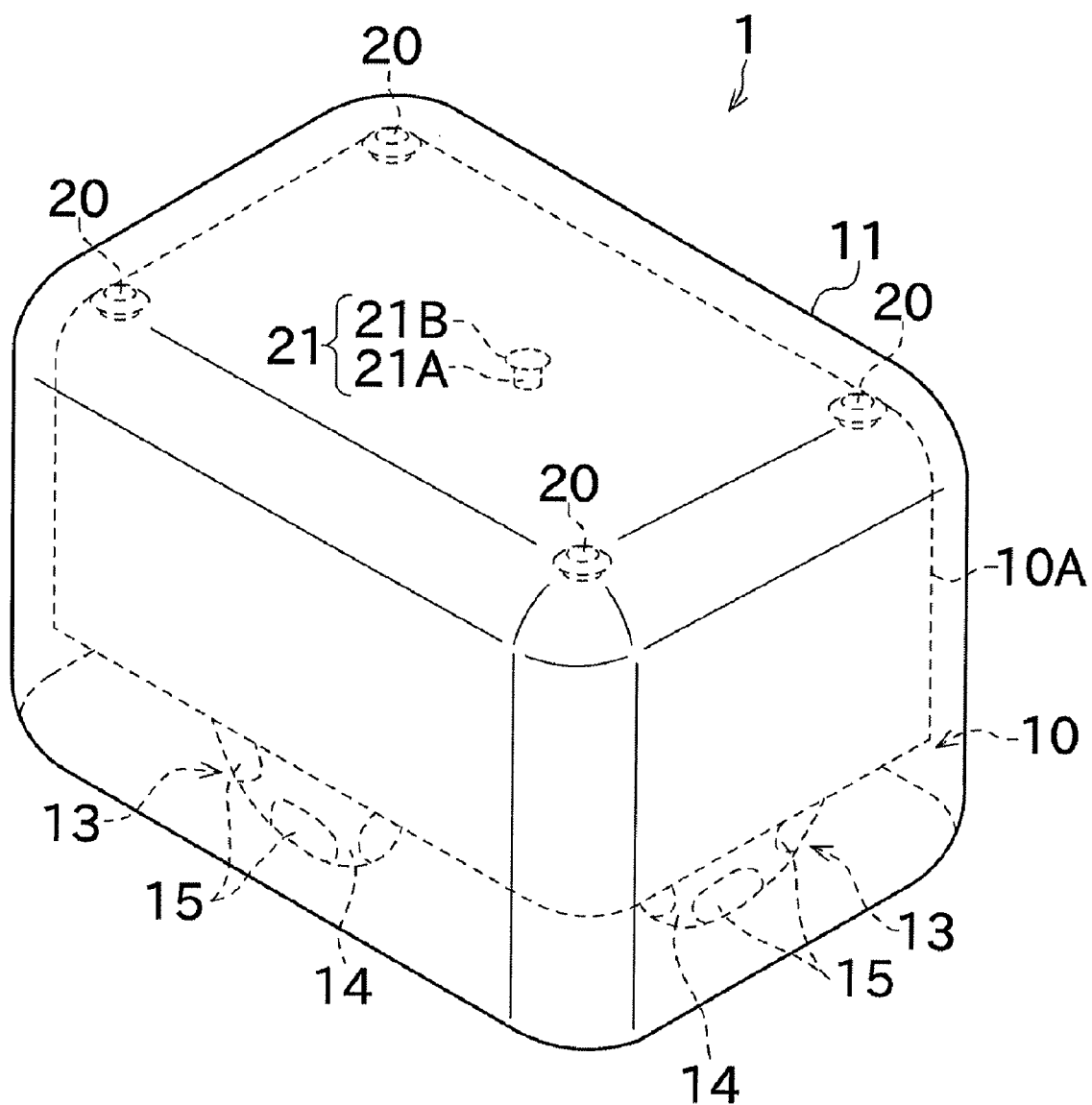
FIG. 1 is a perspective view of an autonomous moving apparatus according to a first preferred embodiment of the present invention.

Preferred embodiments of the present invention will be described in detail with reference to the drawings. Like elements are given like reference numerals in each of the drawings to avoid repetition of the description.

First Preferred Embodiment

Figure 2:
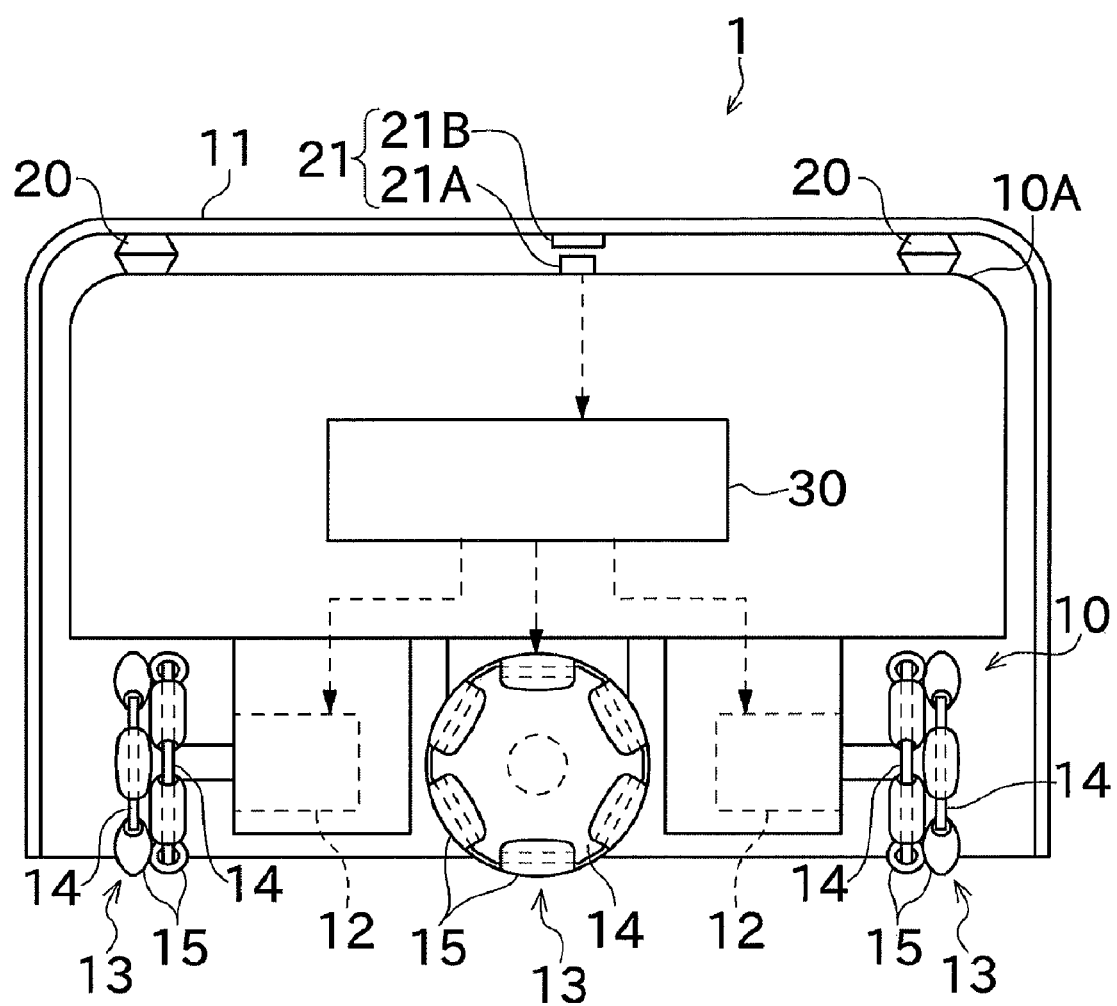
FIG. 2 is a block diagram of a configuration of the autonomous moving apparatus according to the first preferred embodiment of the present invention.

A configuration of an autonomous moving apparatus 1 according to a first preferred embodiment will be described with reference to FIGS. 1 and 2. FIG. 1 is a perspective view of the autonomous moving apparatus 1. FIG. 2 is a block diagram of the configuration of the autonomous moving apparatus 1.

The autonomous moving apparatus 1 includes, for example, a function of detecting contacts or collisions with obstacles or the like, and a function of autonomously moving while performing an avoidance operation, such as a temporal stop, when the contacts, collisions, or the like are detected. Accordingly, the autonomous moving apparatus 1 preferably includes, for example, a vehicle 10 provided with electric motors 12 and omni-wheels 13 that are driven by the electric motors 12, each of the motors 12 and the omni-wheels 13 are preferably arranged in a lower portion of the vehicle 10; a cover 11 that preferably covers each of front, back, right, and left side surfaces and an upper surface of the vehicle 10 and that is attached to the vehicle 10 in such a manner that the cover 11 can be displaced with respect to the vehicle 10; a first proximity switch 21 arranged to be turned on and off in accordance with the displacement of the upper surface of the vehicle 10 and the cover 11 facing the upper surface; and an electronic control device 30 arranged to control the electric motors 12 in accordance with on/off signals that are output from the first proximity switch 21. Each of the above elements is described in detail below.

The vehicle 10 preferably includes a frame 10A having, but not limited to, the shape of a substantially rectangular solid. There are preferably four electric motors 12 attached to a lower portion of the frame 10A and arranged in the shape of a cross, for example. The omni-wheels 13 are attached to respective drive axes of the four electric motors 12. In other words, the four omni-wheels 13 are preferably arranged on an outer circumference at 90 degree angles from one another along a circumferential direction.

The omni-wheel 13 is a wheel that preferably includes two separate wheels 14 arranged to rotate about the drive axis of the electric motor 12 and six free rollers 15 provided on an outer circumference of each of the wheels 14 in such a manner that the free rollers 15 can rotate about an axis that is perpendicular or substantially perpendicular to the drive axis of the electric motor 12. The omni-wheel 13 is thus capable of omni-directional movement. The two wheels 14 are arranged with phases thereof shifted by about 30 degrees, for example. With the above configuration, when the electric motor 12 is driven, and the wheel 14 is resultantly rotated, and the six free rollers 15 are rotated along with the wheel 14. By having the free roller 15 that is in contact with a ground rotated, the omni-wheel 13 can also move in a direction that is parallel or substantially parallel with a rotational axis of the wheel 14. Therefore, by individually controlling the four electric motors 12, and by individually adjusting a rotational direction and a rotational speed of each of the four omni-wheels 13, the flat movement or the circulating operation of the autonomous moving apparatus 1 in a prescribed direction (in any desired direction) can be achieved.

Four insulators 20 are preferably arranged to support the cover 11 in such a manner that the cover 11 can be displaced with respect to the vehicle 10 are provided at four corners on the upper surface of the vehicle 10 (the frame 10A). The cover 11 may be made of, but is not limited to, metal or synthetic resin, for example, and preferably covers the front, back, right, and left side surfaces and the upper surface of the vehicle 10. The cover 11 preferably has a rectangular shape in its plan view, for example. The insulators 20 may be made of an elastic member such as, but not limited to, rubber or springs. The insulators 20 are arranged to maintain the cover 11 in a floating state with respect to the frame 10A. The insulators 20 displace the cover 11 in accordance with the magnitude of external forces that are applied by an obstacle, or the like, when the cover 11 makes contact with the obstacle, and the insulators 20 also absorb vibrations arising from the contact. In other words, the insulators 20 function as supporting members. In place of or in addition to the upper surface of the vehicle 10, the insulators 20 may be attached to the side surfaces of the vehicle 10. The insulators 20 are not limited to the above configuration in which an amount of displacement is proportional to the external forces, but may have other configurations as long as the insulators 20 recognize correlation between the external forces and the amount of displacement.

The first proximity switch 21 that is turned on/off in accordance with the relative displacement of the upper surface of the vehicle 10 and the cover 11 facing the upper surface is preferably attached to the upper surface of the vehicle 10 (the frame 10A) and to an inner surface of the cover 11 facing the upper surface. The first proximity switch 21 is preferably a sensor that contactlessly detects the absence/presence of a detection target. In the present preferred embodiment, a capacitance proximity switch arranged to detect the absence/presence of the detection target (detection body) in accordance with a capacitance change generated between the detection body (dog) and the sensor is preferably used as the first proximity switch 21.

The first proximity switch 21 is preferably arranged at a substantially central portion of the vehicle 10 in its plan view. More specifically, the first proximity switch 21 is attached to a position that is slightly offset from the center of the upper surface of the frame 10A. Thus, even when the external forces that rotate the cover 11 about the center of the frame 10A are applied, the displacement of the cover 11 can be reliably detected.

The first proximity switch 21 preferably includes a sensor 21A attached to the upper surface of the vehicle 10 and a detection body 21B that is made of, but not limited to, a round-shaped metal plate and attached to the inner surface of the cover 11 at a position that faces the sensor 21A. In accordance with the capacitance between the detection body 21B and the sensor 21A, the first proximity switch 21 outputs an on-signal when the detection body 21B is in a detection area of the sensor 21A and outputs an off-signal when the detection body 21B is not in the detection area of the sensor 21A. Accordingly, the first proximity switch 21 outputs the on-signal when the autonomous moving apparatus 1 is not in contact with an obstacle or the like. To the contrary, the first proximity switch 21 outputs the off-signal when the autonomous moving apparatus 1 makes contact with an obstacle or the like, the cover 11 is resultantly displaced in a horizontal direction with respect to the vehicle 10, and the detection body 21B accordingly departs from the detection area of the sensor 21A. Thus, the first proximity switch 21 functions as a detection unit. The first proximity switch 21 is connected with the electronic control device 30, and the detection result (i.e., on/off signals) is output from the first proximity switch 21 to the electronic control device 30.

The electronic control device 30 controls the autonomous moving apparatus 1. The electronic control device 30 preferably includes, for example, a microprocessor arranged to provide arithmetic processing; a Read Only Memory (ROM) arranged to store programs, etc., that are used to execute each process through the microprocessor; a Random Access Memory (RAM) arranged to temporarily store various data such as results of the arithmetic processing; and a backup RAM arranged to retain storage contents thereof through a battery. The electronic control device 30 preferably further includes an interface circuit that electrically connects the first proximity switch 21 and the microprocessor and a driver circuit that drives the electric motors 12, for example.

While detecting contacts with the obstacles or the like, the electronic control device 30 is arranged to control the autonomous moving apparatus 1 such that the apparatus 1 autonomously moves to a pre-set target position in accordance with, for example, a stored environmental map and a position of the apparatus 1 recognized by a laser rangefinder, or the like. When performing the autonomous movement, the electronic control device 30 determines whether or not the apparatus 1 has made (or is in) contact with an obstacle, or the like, based on the detection result of the first proximity switch 21, and controls the electric motors 12 based on a determination result. In other words, when the contact with the obstacle or the like is not determined, the electronic control device 30 continues the autonomous movement by driving the electric motors 12, but when the contact is determined, the electronic control device 30 stops the autonomous moving apparatus 1 by stopping the drive of the electric motors 12. Thus, the electronic control device 30 functions as a control unit.

Figure 3:
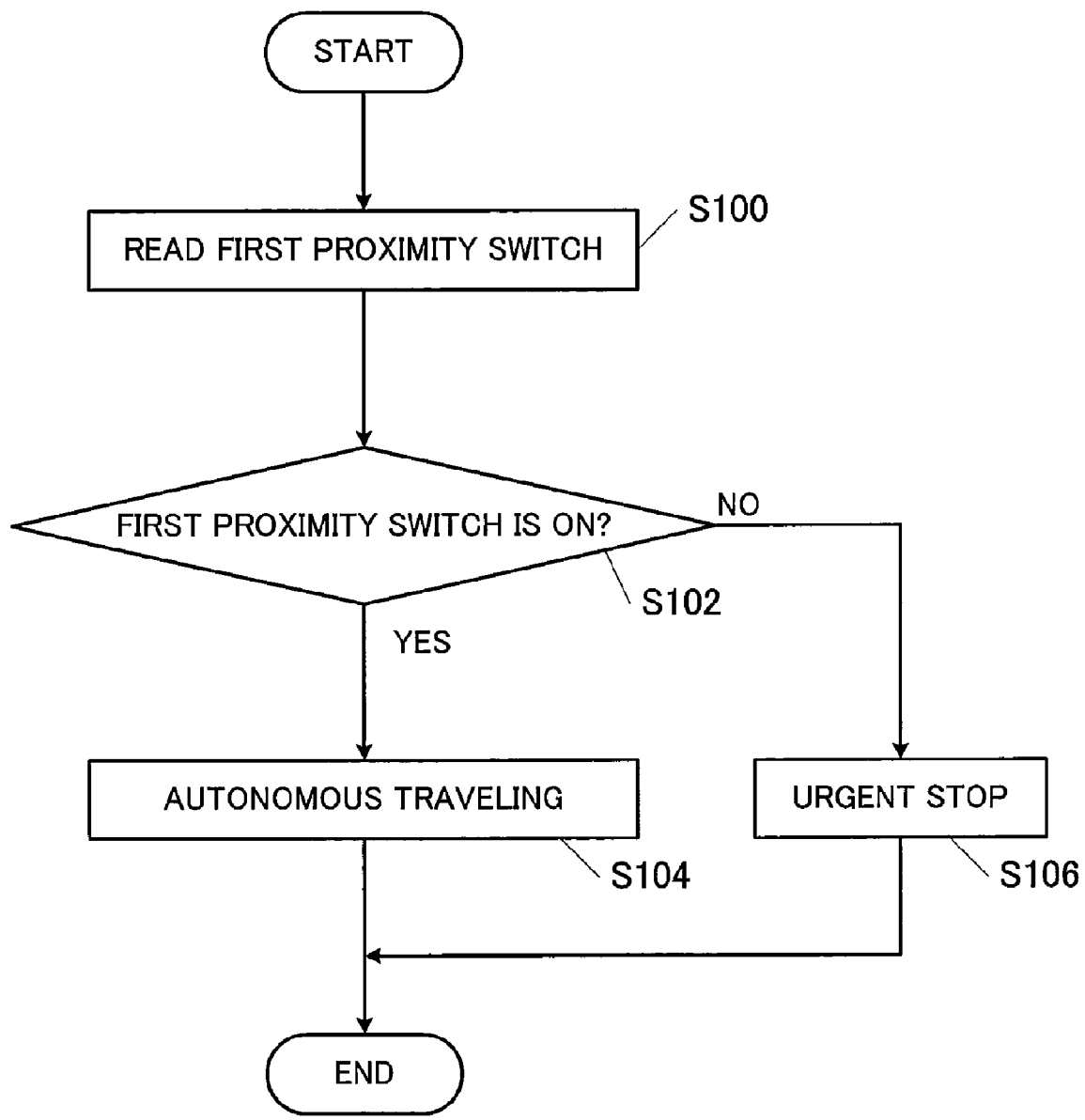
FIG. 3 is a flowchart representing procedures of a contact detecting process performed by the autonomous moving apparatus according to the first preferred embodiment of the present invention.

Operations of the autonomous moving apparatus 1 will now be described with reference to FIG. 3. FIG. 3 is a flowchart representing procedures of a contact detecting process performed by the autonomous moving apparatus 1. The contact detecting process of FIG. 3 is performed primarily by the electronic control device 30 and repeated at the prescribed timing between the time when the power of the apparatus 1 is turned on and the time when the power is turned off.

A state of the first proximity switch 21 (i.e., an ON state or an OFF state) is read in step S100. Then, whether or not the state of the first proximity switch 21 read in S100 indicates the ON state is determined in step S102. In the ON state of the first proximity switch 21, it is determined that the apparatus 1 has not made (is not in) contact with any obstacles, and the autonomous movement is continued (step S104). In the OFF state of the first proximity switch 21, it is determined that the apparatus 1 has made (is in) contact with an obstacle or the like, the drive of the electric motors 12 is stopped, and the autonomous moving apparatus 1 is urgently stopped (step S106).

As described above, the autonomous moving apparatus 1 in the present preferred embodiment preferably includes the vehicle 10, the cover 11, the first proximity switch 21, and the electronic control device 30. The vehicle 10 includes a drive unit. The cover 11 covers the side surfaces and the upper surface of the vehicle 10 and is attached to the vehicle 10 in such a manner that the cover 11 can be displaced with respect to the vehicle 10. The first proximity switch 21 is arranged at the central portion of the vehicle 10 and outputs the on/off detection signals when the cover 11 is displaced by a prescribed value with respect to the vehicle 10. The electronic control device 30 controls the electric motors 12 (i.e., the drive unit) in accordance with the detection signals output from the first proximity switch 21.

Thus, when the autonomous moving apparatus 1 has made contact with the obstacle or the like, for example, the cover 11 is displaced with respect to the vehicle 10 by the external forces applied to the autonomous moving apparatus 1. By detecting the relative displacement by the first proximity switch 21 arranged at the central portion of the vehicle 10, the relative displacement of the cover 11 in all directions can be evenly detected. As a result, it is not necessary to provide a detection unit with respect to each direction on the assumption of omni-directional contacts with the obstacles, or the like, thereby the number of detection units can be reduced. Moreover, the omni-directional contacts or collisions can be detected by using the reasonable, simply-configured, binary proximity switch 21 that can be turned on and off. Further, since the first proximity switch 21 is arranged at the central portion, wiring arrangement or the like can be simplified, and the configuration arranged to detect the contacts and the collisions can also be simplified.

Second Preferred Embodiment

Figure 4:
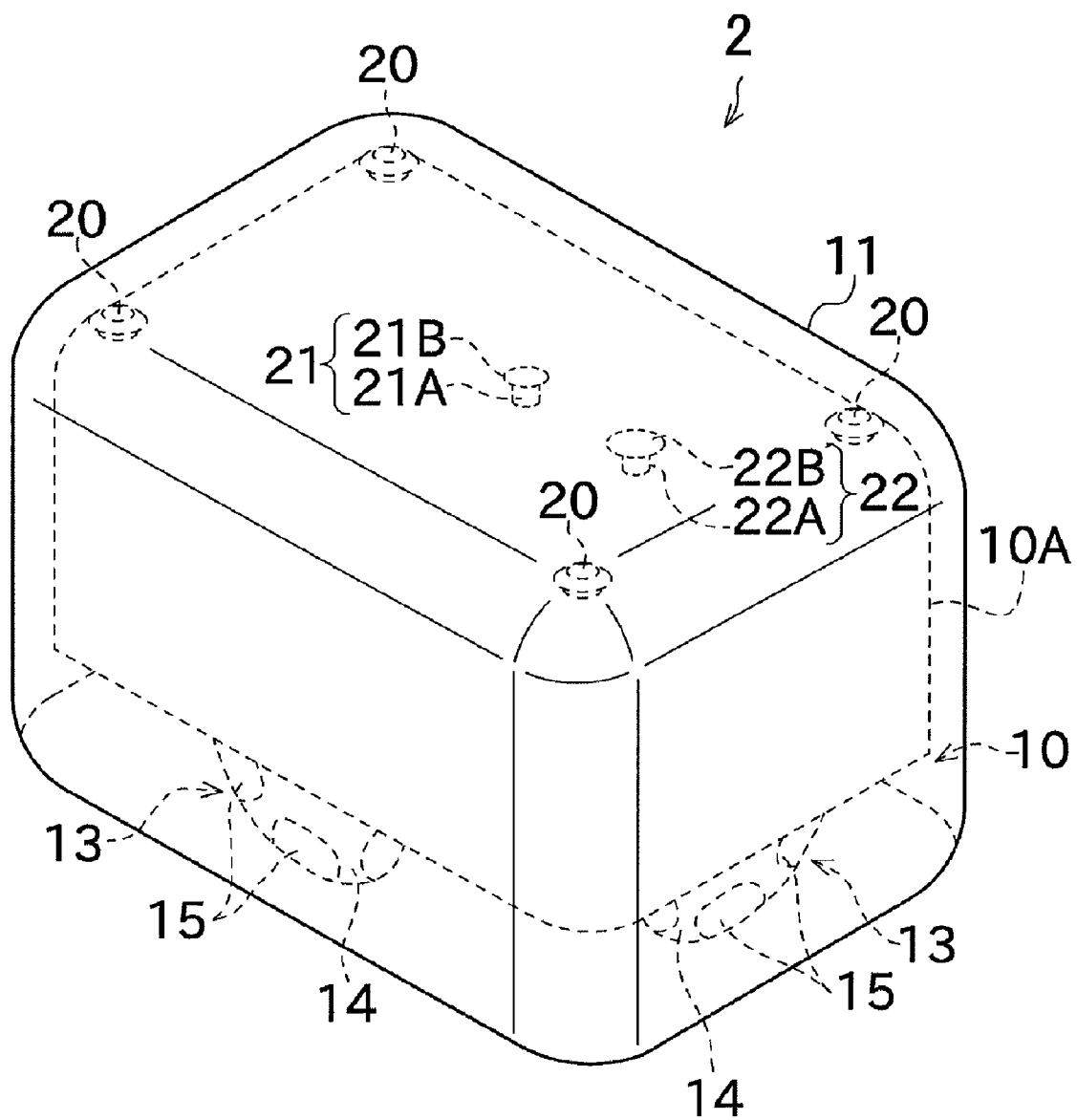
FIG. 4 is a perspective view of an autonomous moving apparatus according to a second preferred embodiment of the present invention.
Figure 5:
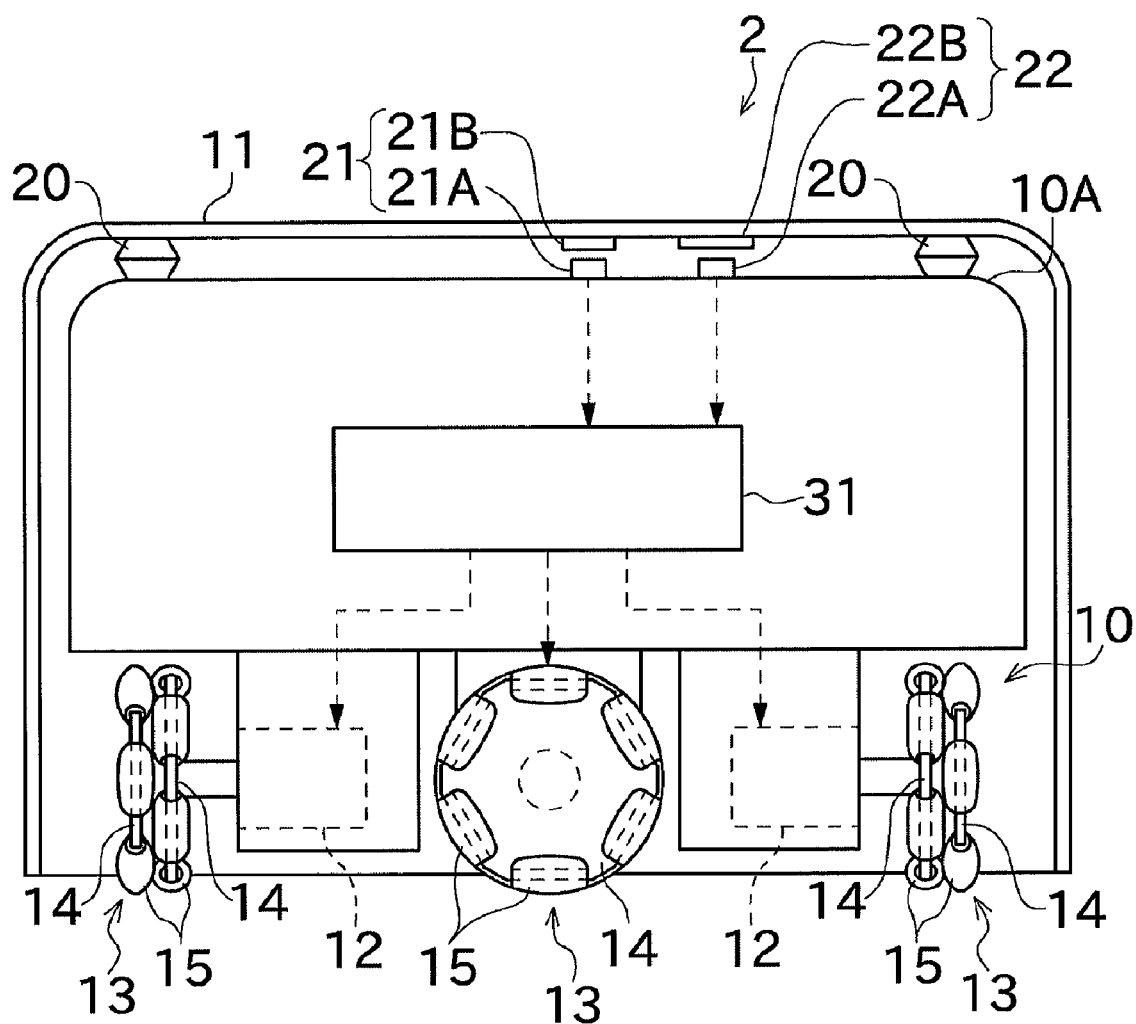
FIG. 5 is a block diagram of a configuration of the autonomous moving apparatus according to the second preferred embodiment of the present invention.

Next, a configuration of an autonomous moving apparatus 2 according to a second preferred embodiment of the present invention will be described with reference to FIGS. 4 and 5. FIG. 4 is a perspective view of the autonomous moving apparatus 2. FIG. 5 is a block diagram of the configuration of the autonomous moving apparatus 2. In FIGS. 4 and 5, like reference numerals are given to like elements that are similar to or have a configuration similar to that of the first preferred embodiment.

The autonomous moving apparatus 2 is different from the autonomous moving apparatus 1 of the first preferred embodiment in that the apparatus 2 further includes, in addition to the first proximity switch 21, a second proximity switch 22 having detection characteristics that are different from those of the first proximity switch 21. Further, the apparatus 2 is different from the apparatus 1 in that the autonomous moving apparatus 2 includes an electronic control device 31 arranged to control the electric motors 12 in accordance with on/off signals output from the first and second proximity switches 21 and 22 in place of the above electronic control device 30. Elements that are different from that of the autonomous moving apparatus 1 will now be described in detail. Other configurations will be omitted since they are the same as or similar to that of the autonomous moving apparatus 1.

In addition to the first proximity switch 21, the second proximity switch 22 is arranged to be turned on and off in accordance with the relative displacement of the upper surface of the vehicle 10 and the cover 11 facing the upper surface is attached to the upper surface of the vehicle 10 (frame 10A) and to the inner surface of the cover 11 facing the upper surface. Similarly to the first proximity switch 21, the second proximity switch 22 is also preferably a sensor that contactlessly detects the absence/presence of a detection target. In the present preferred embodiment, a capacitance proximity switch arranged to detect the absence/presence of the detection target (detection body) in accordance with a capacitance change generated between the detection body (dog) and the sensor is used as the second proximity switch 22. Even when the external forces that rotate the cover 11 about a rotational axis are applied, the second proximity switch 22 reliably detects the displacement of the cover 11. Therefore, the second proximity switch 22 is preferably attached at a position that is offset from the rotational axis of the cover 11. In the present preferred embodiment, the second proximity switch 22 is arranged at a position that is slightly spaced away from the central portion of the vehicle 10 towards an outside in a longitudinal direction of the rectangular cover 11.

The second proximity switch 22 preferably includes a sensor 22A attached to the upper surface of the vehicle 10 and a detection body 22B that is preferably made of, but not limited to, a round-shaped metal plate and attached to the inner surface of the cover 11 at a position that faces the sensor 22A. Similarly to the first proximity switch 21, in accordance with the capacitance between the detection body 22B and the sensor 22A, the second proximity switch 22 outputs an on-signal when the detection body 22B is in a detection area of the sensor 22A and outputs an off-signal when the detection body 22B is not in the detection area of the sensor 22A. Accordingly, the second proximity switch 22 outputs the on-signal when the autonomous moving apparatus 2 has not made (is not in) contact with any obstacle, or the like. Accordingly, the second proximity switch 22 outputs the off-signal when the autonomous moving apparatus 2 has made contact with an obstacle, or the like, the cover 11 is resultantly displaced in the horizontal direction with respect to the vehicle 10, and the detection body 22B accordingly departs from the detection area of the sensor 22A.

By providing the detection body 22B with a diameter that is different from that of the detection body 21B, the second proximity switch 22 is set to have the detection characteristics that are different from that of the first proximity switch 21 with respect to the displacement (in other words, intensity of contact) of the cover 11. More specifically, the diameter of the detection body 22B is set to be greater (for example, about 10 mm) than the diameter (for example, about 8 mm) of the detection body 21B. Accordingly, when an amount of displacement of the cover 11 is greater than the amount of displacement that switches the first proximity switch 21 from the ON state into the OFF state, i.e., when greater external forces are applied (when the intensity of the contact is greater), the second proximity switch 22 is switched from the ON state into the OFF state. Thus, the second proximity switch 22 functions as a second detection unit.

In the present preferred embodiment, by having the different diameters of the detection bodies 21b and 22B, and by using the two proximity switches resultantly having the different displacement detection characteristics, the intensity of the contacts with the obstacles or the like can be detected in three stages (i.e., no contact, a slight contact, and an intense contact). Each of the first proximity switch 21 and the second proximity switch 22 is connected with the electronic control device 31, and the detection results (on/off signals) by the first and second proximity switches 21 and 22 are output to the electronic control device 31.

The electronic control device 31 includes an interface circuit that electrically connects the first, second proximity switches 21, 22, and the microprocessor. When performing the autonomous movement, the electronic control device 31 determines whether or not the apparatus 2 has made (is in) contact with the obstacles or the like and the intensity of the contact based on the detection results of the first and second proximity switches 21 and 22, and accordingly controls the electric motors 12 based on the determination results. More specifically, the electronic control device 31 preferably continues the autonomous movement when no contact with the obstacles or the like is determined, temporarily stops the electric motors 12 when a slight contact is determined, and urgently stops the electric motors 12 when an intense contact is determined. That is, the electronic control device 31 of the autonomous moving apparatus 2 of the present preferred embodiment also functions as the control unit.

Figure 6:
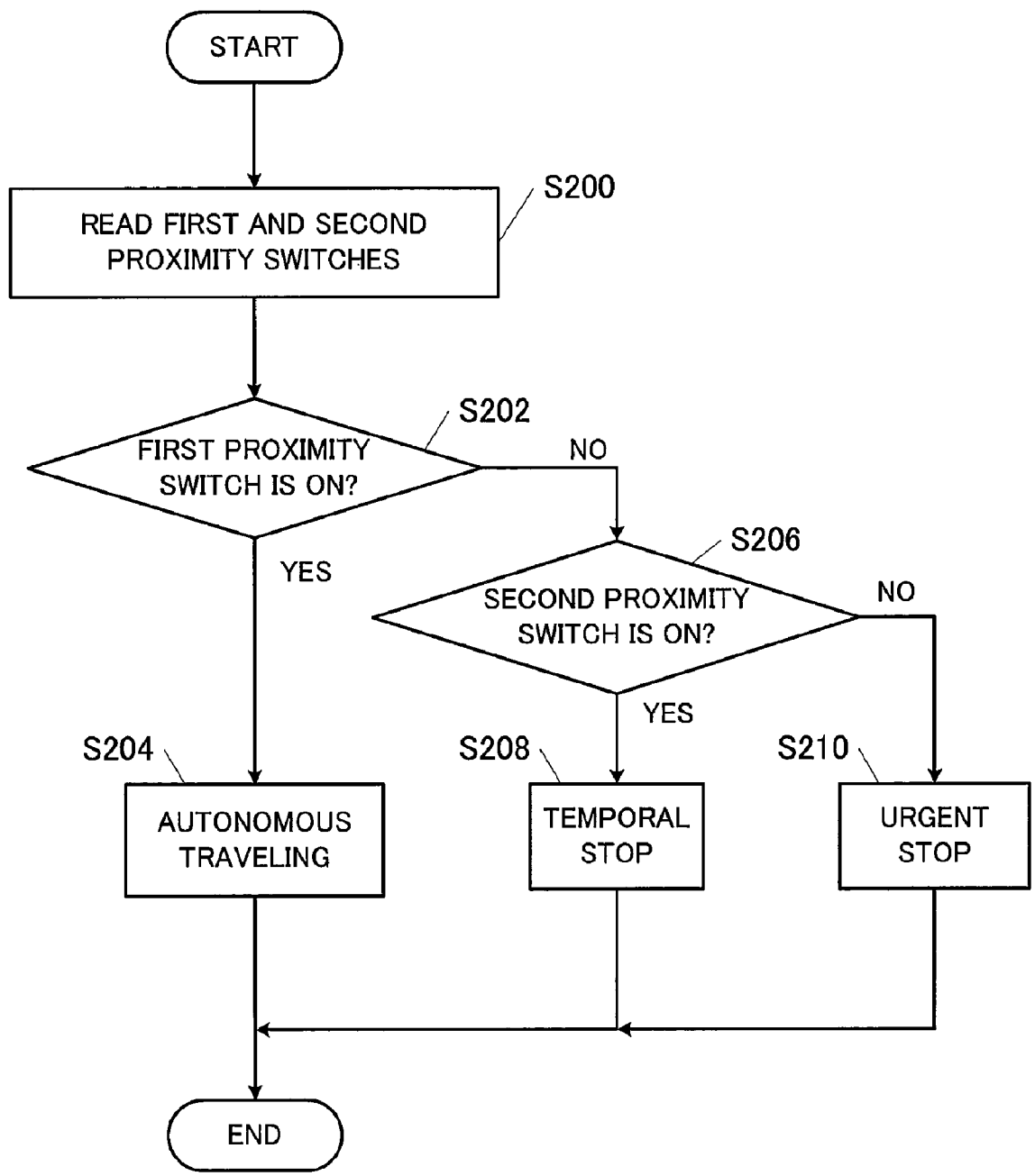
FIG. 6 is a flowchart representing procedures of a contact detecting process performed by the autonomous moving apparatus according to the second preferred embodiment of the present invention.

Operations of the autonomous moving apparatus 2 will now be described with reference to FIG. 6. FIG. 6 is a flow-chart representing procedures of a contact detecting process performed by the autonomous moving apparatus 2. The contact detecting process of FIG. 6 is performed primarily by the electronic control device 31 and repeated at the prescribed timing between the time when the power of the apparatus 2 is turned on and the time when the power is turned off.

States of the first proximity switch 21 and the second proximity switch 22 (i.e., an ON state or an OFF state) are read in step S200. Then, whether or not the state of the first proximity switch 21 read in S200 indicates the ON state is determined in step S202. In the ON state of the first proximity switch 21, it is determined that the apparatus 2 has not made (is not in) contact with any obstacles, and the autonomous movement is continued (step S204). In the OFF state of the first proximity switch 21, it is determined that the apparatus 2 has made (is in) contact with an obstacle or the like, and the process proceeds to step S206.

Whether or not the state of the second proximity switch 22 read in step S200 indicates the ON state is determined in step S206. In the ON state of the second proximity switch 22, it is determined that a level of the contact with the obstacle or the like is relatively low, and the drive of the electric motors 12 is temporarily stopped so that the autonomous moving apparatus 2 is temporarily stopped (S208). In the OFF state of the second proximity switch 22, it is determined that the level of the contact with the obstacle is relatively high, and the drive of the electric motors 12 is urgently stopped so that the autonomous moving apparatus 2 is urgently stopped (S210).

As described above, the autonomous moving apparatus 2 of the present preferred embodiment further includes the second proximity switch 22, which has the detection characteristics that are different from that of the first proximity switch 21. The second proximity switch 22 outputs the off detection signal when the cover 11 is displaced with respect to the vehicle 10 by a value that is greater than the prescribed value of the first proximity switch 21. The electronic control device 31 controls the electric motors 12 (the drive unit) in accordance with the on/off signals output from the first proximity switch 21 and the on/off signals output from the second proximity switch 22.

Thus, the intensity of contacts can be detected in three stages (i.e., no contact, a slight contact, and an intense contact). Moreover, by controlling the drive unit in accordance with the magnitude (intensity) of the detected contacts, a stop operation and an avoidance operation, or the like, can be controlled in stages in accordance with the magnitude (intensity) of the detected contacts.

In the present preferred embodiment, the second proximity switch 22 is preferably arranged away from the central portion of the vehicle 10 in a plan view, however, the second detection unit may be arranged at the central portion of the vehicle.

Third Preferred Embodiment

Figure 7:
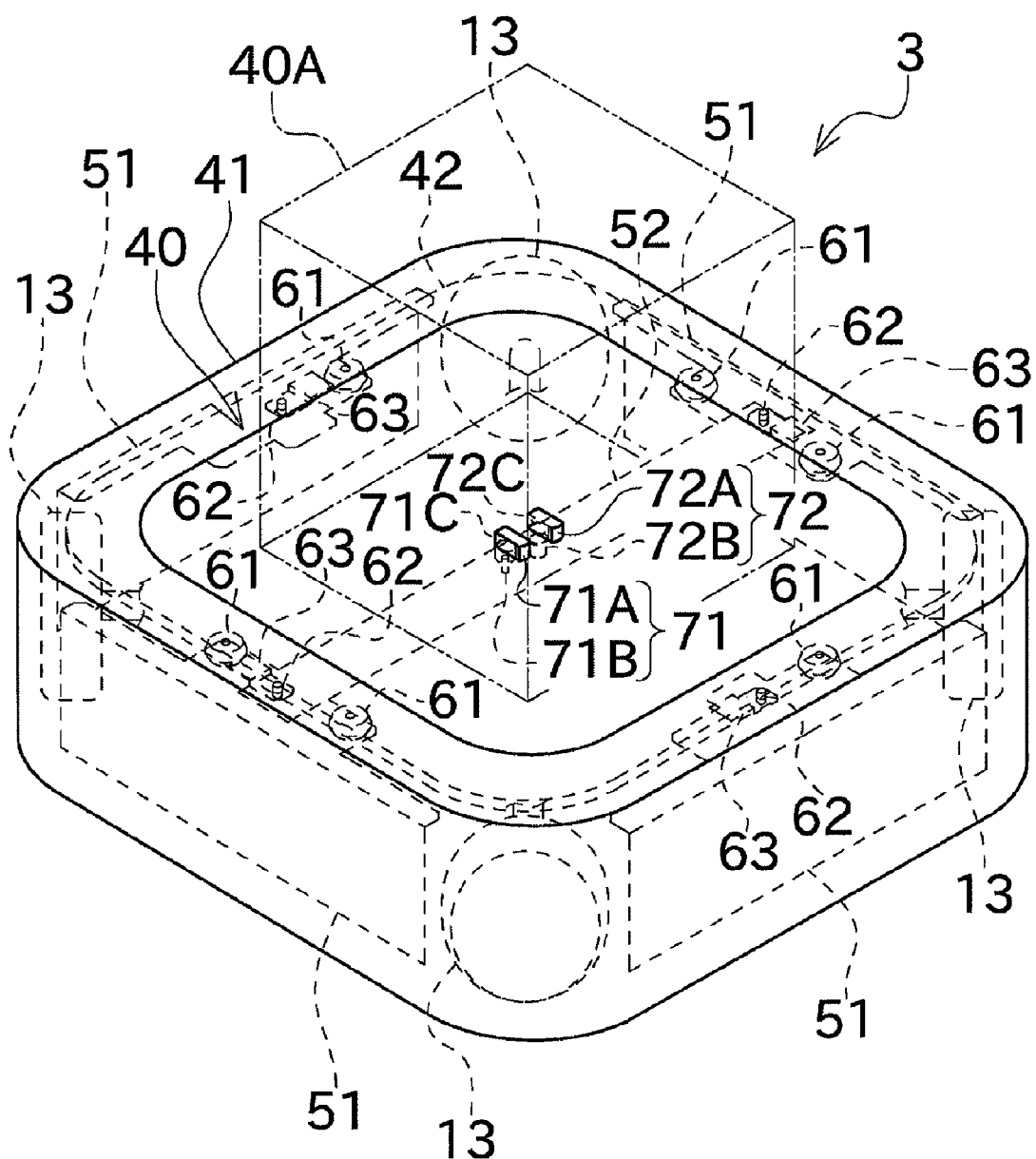
FIG. 7 is a perspective view of an autonomous moving apparatus according to a third preferred embodiment of the present invention.
Figure 8:
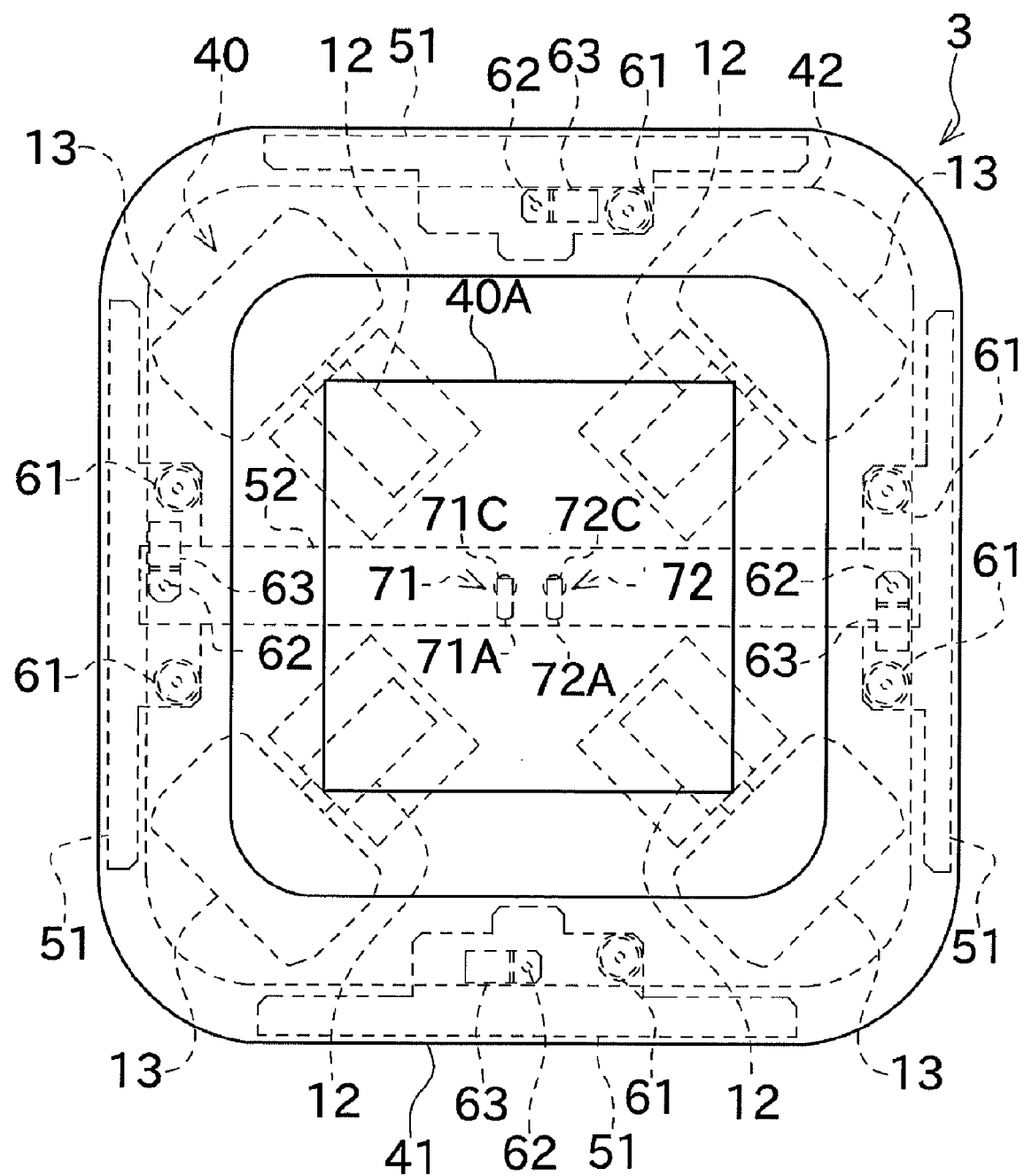
FIG. 8 is a plan view of the autonomous moving apparatus according to the third preferred embodiment of the present invention.
Figure 9:
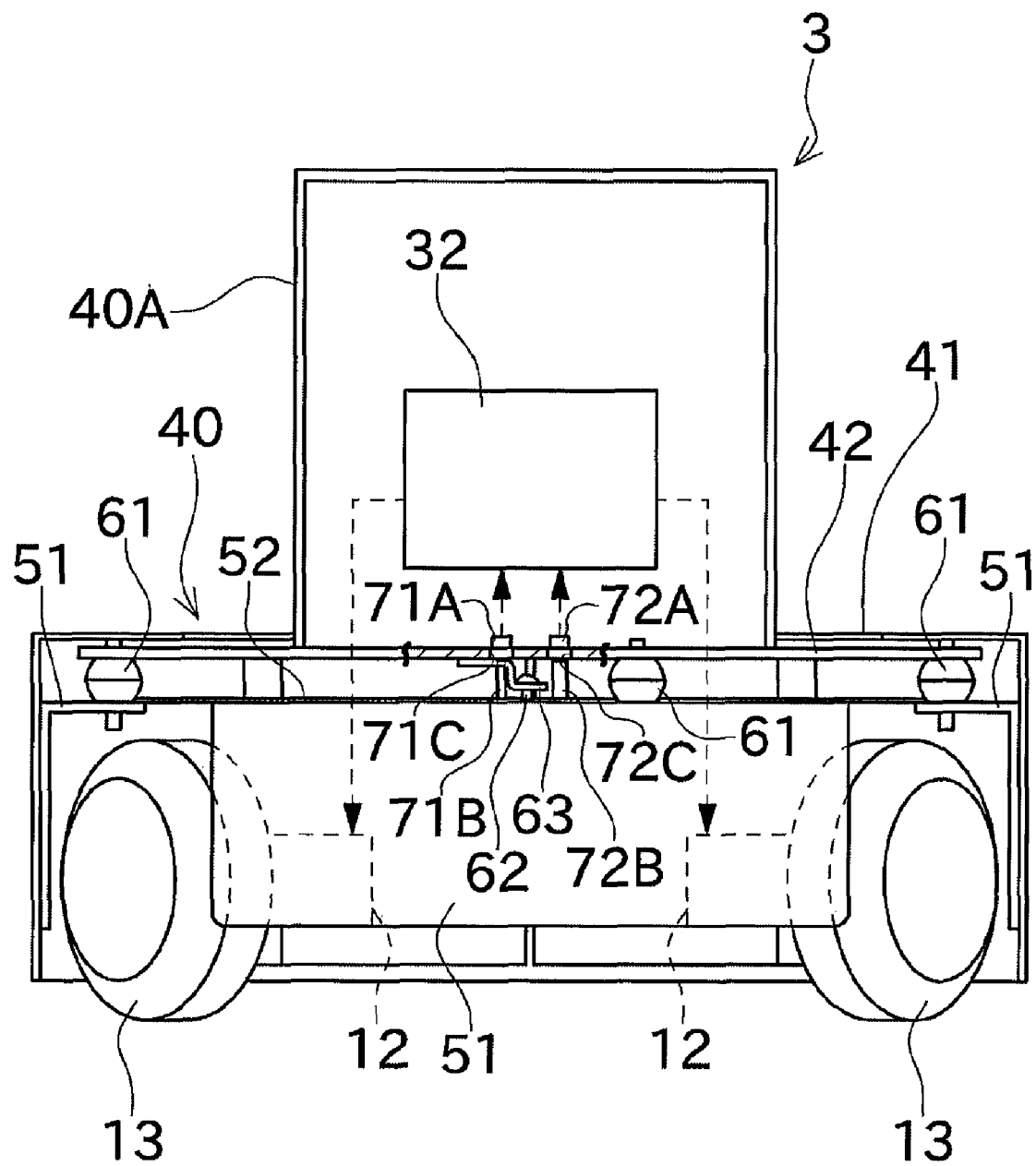
FIG. 9 is a diagram of a configuration of the autonomous moving apparatus according to the third preferred embodiment of the present invention.

Next, a configuration of an autonomous moving apparatus 3 according to a third preferred embodiment of the present invention will be described with reference to FIGS. 7 through 9. FIG. 7 is a perspective view of the autonomous moving apparatus 3. FIG. 8 is a plan view of the autonomous moving apparatus 3. FIG. 9 is a diagram of the configuration of the autonomous moving apparatus 3. In FIGS. 7 through 9, like reference numerals are given to like elements that are similar to or have a configuration similar to that of the first and second preferred embodiments.

Similarly to the first and second preferred embodiments, the autonomous moving apparatus 3 of the third preferred embodiment includes a function of detecting contacts or collisions with obstacles, or the like, and a function of autonomously moving while performing an avoidance operation, such as a temporal stop, when the contacts or the like with the obstacles are detected. The autonomous moving apparatus 3 preferably includes a vehicle 40, a cover 41, a first proximity switch 71, a second proximity switch 72, and an electronic control device 32. The vehicle 40 includes a drive unit that enables traveling, and thus enables the autonomous moving apparatus 3 to travel. The cover 41 preferably has a substantially square shape in its plan view, and protects the surrounding of the vehicle 40 from the contacts with the obstacles, or the like. The first and second proximity switches 71 and 72 output on/off detection signals in accordance with the relative displacement of the vehicle 40 and the cover 41 and detect that the autonomous moving apparatus 3 has made contact with the obstacles or the like. The electronic control device 32 is arranged to control the electric motors 12 of the drive unit in accordance with the on/off signals output from the first and second proximity switches 71 and 72. Each of the elements is described below in detail.

The vehicle 40 includes a frame 40A, a bottom plate frame 42 arranged to support the frame 40A, and the drive unit. The frame 40A holds the electronic control device 32 therein. The bottom plate frame 42 preferably has a substantially square shape with four round-shaped corners in a plan view of FIG. 8, supports the frame 40A on an upper surface side, and includes the drive unit on a lower surface side. The drive unit primarily includes the electric motors 12 and the omni wheels 13, or the like.

As illustrated in FIG. 8, there are preferably four electric motors 12 of the drive unit that are preferably arranged in a cross shape such that the motors 12 overlap with diagonal lines of the bottom plate frame 42. The omni-wheels 13 are attached to respective drive axes of the four electric motors 12. In other words, the four omni-wheels 13 are arranged on an outer circumference with intervals of 90 degrees between each other along a circumferential direction and are attached to a lower portion of the vehicle 40 such that the omni-wheels 13 correspond to the four corners of the bottom plate frame 42. The configurations of the electric motors 12 and the omni-wheels 13 are similar to that of the first and second preferred embodiments, and accordingly, detailed description thereof will be omitted. The autonomous moving apparatus 3 can be moved to a prescribed direction (in any desired direction) through the drive unit.

The cover 41 is preferably made of metal or resin, for example, configured as a frame-shaped external cover having a symmetric shape when viewed from the central portion of the vehicle in the plan view of FIG. 8, and thus covers front, back, right, and left side surfaces of the lower portion of the vehicle 40. The cover 41 is supported from inside by four cover frames 51 arranged to surround front, back, right, and left sides of the drive unit provided in the lower portion of the vehicle 40. As illustrated in FIG. 8, in the present preferred embodiment, the cover 41 preferably has the shape of a substantially rectangular solid with opened central portions of the upper surface and lower surface, however, such a shape may be changed to a cylindrical-column shape, a dome shape, or any other desirable shape, for example. In such a case, the cover may preferably be symmetric when viewed from the central portion of the vehicle.

The cover frame 51 is preferably defined by perpendicularly or substantially perpendicularly folding one edge of a flat member. The cover frame 51 is arranged such that one plain surface faces the lower surface of the bottom plate frame 42 and the other plain surface faces the horizontal direction (i.e., faces towards a side direction). From among the four cover frames 51, the cover frame 51 on a front side and the cover frame 51 on a rear side are connected by a flat frame connecting member 52. An upper surface of the frame connecting member 52 faces the lower surface of the bottom plate frame 42. The frame connecting member 52 is arranged to cross the central portion of the vehicle 40, and a first detection body 71B and a second detection body 72B, which are a portion of the first and second proximity switches 71 and 72 to be described later, are provided in a midway portion of the frame connecting member 52.

The cover frame 51 of the present preferred embodiment is preferably supported on the lower surface side of the bottom plate frame 42 by a GelBush 61. The GelBush 61 is made of gel and functions as an elastically transformable supporting member. More specifically, as illustrated in FIGS. 7 and 8, two GelBushes 61 aligned side by side are provided on an upper surface of the front-side cover frame 51 and on an upper surface of the rear-side cover frame 51. Further, one GelBush 61 is provided on an upper surface of the left-side cover frame 51 and on an upper surface of the right-side cover frame 51 such that each of the GelBushes 61 is situated nearer to the front side in relation to the center of the bottom frame 42. As illustrated in FIG. 9, in a state in which the GelBushes 61 are sandwiched between the lower surface of the bottom plate frame 42 and the upper surface of the cover frames 51, the bottom plate frame 42 and the cover frames 51 are attached to the GelBushes 61 by a bolt, a washer, or the like.

The number of GelBushes 61 may be changed to any desirable number. For example, similarly to the front-side and rear-side cover frames 51, two GelBushes 61 may be provided on the upper surface of the right-side cover frame 51 and on the upper surface of the left-side cover frame 51, i.e., eight GelBushes 61 in total may be provided to support the cover frames 51.

In a state in which the cover frames 51 are attached to the bottom plate frame 42, the cover 41 is fixed to the side surface of each of the cover frames 51 by an unillustrated fixing member such as a screw, for example. Thus, the cover 41 can be supported by the vehicle 40 via the supporting members (GelBushes 61) in a state in which the cover 41 is suspended with respect to the bottom plate frame 42. Since the GelBush 61 is elastically deformable, the cover 41 can slightly change its position vertically and horizontally with respect to the bottom plate frame 42. Thus, when the obstacles or the like makes contact with the cover 41 of the autonomous moving apparatus 3, the GelBushes 61 are transformed in response to the external forces, and the cover 41 is displaced with respect to the vehicle 40.

The supporting member arranged between the bottom plate frame 42 and the cover frame 51 is not limited to the GelBush 61. For example, in place of the GelBush 61 of the present preferred embodiment, the insulator used in the first and second preferred embodiments or a damper, or the like, may be used.

The bottom plate frame 42 is preferably provided with ball plungers 62 via brackets 63 to restrict the movement in an upper direction of the cover 41. As illustrated in FIG. 8, each of the ball plungers 62 are provided on front, back, right, and back sides (i.e., four ball plungers in total), and a leading edge portion of each of the ball plungers 62 is attached to the lower surface side of the bottom plate frame 42 such that the leading edge portion faces the upper surface of the cover frame 51. More specifically, as illustrated in FIG. 9, the ball plunger 62 is provided by using a vertical space between the bottom plate frame 42 and the cover frame 51 in a state in which an axis portion of the ball plunger 62 is supported by the S-shaped bracket 63. The ball plunger 62 is supported by the bracket 63 such that the leading edge portion on which a ball is provided makes contact with the upper surface of the cover frame 51, thereby preventing the cover frame 51 from being uplifted.

Thus, even when the cover 41 makes contact with the obstacle or the like and is resultantly applied with external forces that uplift the cover 41 obliquely in the upper direction, the movement in the upper direction of the cover 41 is restricted by the ball plungers 62, and thus the cover 41 moves horizontally. Therefore, with the above configuration, the upper direction can be excluded (eliminated) from the axial direction (i.e., vertical direction) of the proximity switch, and thus the detection in the horizontal direction can be accurately performed when the autonomous moving apparatus 3 makes contact with the obstacles, or the like. The descent direction of the axial direction of the proximity switch is a direction that turns off the proximity switch, that is, a direction that stops the autonomous moving apparatus 3. Therefore, it is not necessary to restrict the displacement of the cover 41 in the descent direction.

The first and second proximity switches 71 and 72 are now described. The first and second proximity switches 71 and 72 are sensors that are turned on/off in accordance with the relative displacement of the vehicle 40 and the cover 41, transmit detection signals thereof to the electronic control device 32, and can contactlessly detect the absence/presence of a detection target. Similarly to the first and second preferred embodiments, a capacitance proximity switch is also used in the present preferred embodiment. The first proximity switch 71 includes the first detection body 71B (dog) and a first sensor 71A arranged to detect the first detection body 71B. Similarly, the second proximity switch 72 includes the second detection body 72B (dog) and a second sensor 72A arranged to detect the second detection body 72B.

As illustrated in FIGS. 7 and 8, each of the first and second sensors 71A and 72A is preferably arranged at a substantially central portion on the upper surface side of the bottom plate frame 42. A first penetration hole 71C is defined at a portion where the first sensor 71A of the bottom plate frame 42 is provided. A portion (detection surface) of the first sensor 71A faces, via the first penetration hole 71C, the first detection body 71B arranged on the frame connecting member 52. Similarly, a second penetration hole 72C is defined at a portion where the second detection body 72B is provided. A portion (detection surface) of the second sensor 72A faces, via the second penetration hole 72C, the second detection body 72B arranged on the frame connecting member 52.

The first detection body 71B is made of proper metal and has a cylindrical shape (with a diameter of about 4 mm, for example). The first sensor 71A outputs an on-signal when the first detection body 71B is in a detection area and outputs an off-signal when a distance between the first sensor 71A and the first detection body 71B exceeds a predetermined distance. In the present preferred embodiment, when the autonomous moving apparatus 3 is not in contact with the obstacles or the like, and when the cover 41 is at a neutral position with respect to the vehicle 40, a positional relation of each component is set such that the center of an edge surface of the cylindrical shape of the first detection body 71B faces the center of the detection area of the first sensor 71A. When the cover 41 is at the neutral position, the first sensor 71A outputs the on-signal to the electronic control device 32. When the autonomous moving apparatus 3 makes contact with the obstacle, or the like, the cover 41 is displaced with respect to the vehicle 40, and the first detection body 71B resultantly comes out of the detection area of the first sensor 71A, the first sensor 71A outputs the off-signal to the electronic control device 32.

The second detection body 72B preferably is made of a suitable metal and has a cylindrical shape (having a diameter of about 8 mm, for example). Similarly to the first sensor 71A, the second sensor 72A outputs an on-signal when the second detection body 72B is in the detection area and outputs an off-signal when a distance between the second sensor 72A and the second detection body 72B exceeds a predetermined distance. When the cover 41 is at the neutral position with respect to the vehicle 40, the center of an edge surface of the cylindrical shape of the second detection body 72B is arranged to face the center of the detection area of the second sensor 72A.

By providing the second detection body 72B with a diameter that is different from that of the first detection body 71B, the second proximity switch 72 is set to have detection characteristics with respect to the amount of displacement (i.e., the intensity of the contact) of the cover 41 that are different from that of the first proximity switch 71. More specifically, in the present preferred embodiment, the diameter (preferably about 8 mm, for example) of the second detection body 72B is set to be greater than the diameter (preferably about 4 mm, for example) of the first detection body 71B. Accordingly, when the amount of displacement of the cover 41 exceeds the amount of displacement that switches the first proximity switch 71 from the on-state to the off-state, i.e., when greater external forces are applied (when the cover 41 makes more intense contact with the obstacle), the second proximity switch 72 is switched from the on-state to the off-state. The diameters or shapes of the first and second detection bodies 71B and 72B may be properly changed to any desirable shape to thereby adjusting the degree of an impact to be detected.

With the above configuration, the intensity of the contacts with the obstacles or the like can detected in three stages (i.e., no contact, slight contact, and intense contact). Each of the first and second proximity switches 71 and 72 is connected with the electronic control device 32, and the detection results (i.e., on/off signals) are output by the first and second proximity switches 71 and 72 to the electronic control device 32.

With the above configuration, when the external forces are applied from any of the front, back, right, and left directions of the autonomous moving apparatus 3, the relative displacement in the horizontal direction is generated between the lower surface (bottom plate frame 42) of the vehicle 40 and the frame connecting member 52 (cover 41) facing the lower surface. As described above, the cover 41 is substantially symmetric in its plan view when viewed from the central portion of the vehicle 40. Therefore, the distance from the first proximity switch 71 arranged at the center to the side surface of the cover 41 is substantially the same throughout the circumference of the autonomous moving apparatus 3. Thus, the contacts with the obstacles or the like can be evenly detected with respect to all directions.

In the present preferred embodiment, the ball plungers 62 act as a restriction unit that restricts the movement in the upper direction of the cover 41. Thus, even when the autonomous moving apparatus 3 makes contact with the obstacle or the like and is resultantly applied with the forces that obliquely uplift the cover 41, the relative displacement in the upper direction of the cover 41 is restricted by the ball plungers 62, and the pressing force applied to the cover 41 is guided in the horizontal direction. Accordingly, by detecting the horizontal movement of the cover 41 by the first and second proximity switches 71 and 72, the magnitude of the impact can be accurately detected.

The electronic control device 32 includes an interface circuit that electrically connects the first and second proximity switches 71 and 72 with the microprocessor. When performing the autonomous movement, the electronic control device 32 determines the absence/presence of the contact with the obstacles or the like and the intensity of the contact based on the detection results of the first and second proximity switches 71 and 72, and thus controls the electric motors 12 based on the determination results. More specifically, the electronic control device 32 controls the apparatus 3 such that the autonomous movement is continued when the contact with the obstacles or the like is not determined, the electric motors 12 are temporarily stopped when the apparatus 3 slightly makes contact with the obstacle or the like, and power feeding is stopped when the apparatus 3 intensely makes contact with the obstacle or the like, to urgently stop the electric motors 12.

Since the two proximity switches (first and second proximity switches 71 and 72) each having different detection characteristics are provided in the present preferred embodiment, the intensity of the contacts with the obstacles or the like can be detected in three stages (i.e., no contact, slight contact, and intense contact). Moreover, by controlling the electric motors 12 in accordance with the magnitude (intensity) of the detected contact, a phased avoidance operation, such as a temporal stop and an urgent stop, for example, can be performed in accordance with the intensity of the detected contact. The procedures of the contact detecting process through the autonomous moving apparatus 3 are similar to that of the autonomous moving apparatus 2 of the second preferred embodiment (FIG. 6), and accordingly, the description thereof will be omitted.

Figure 10:
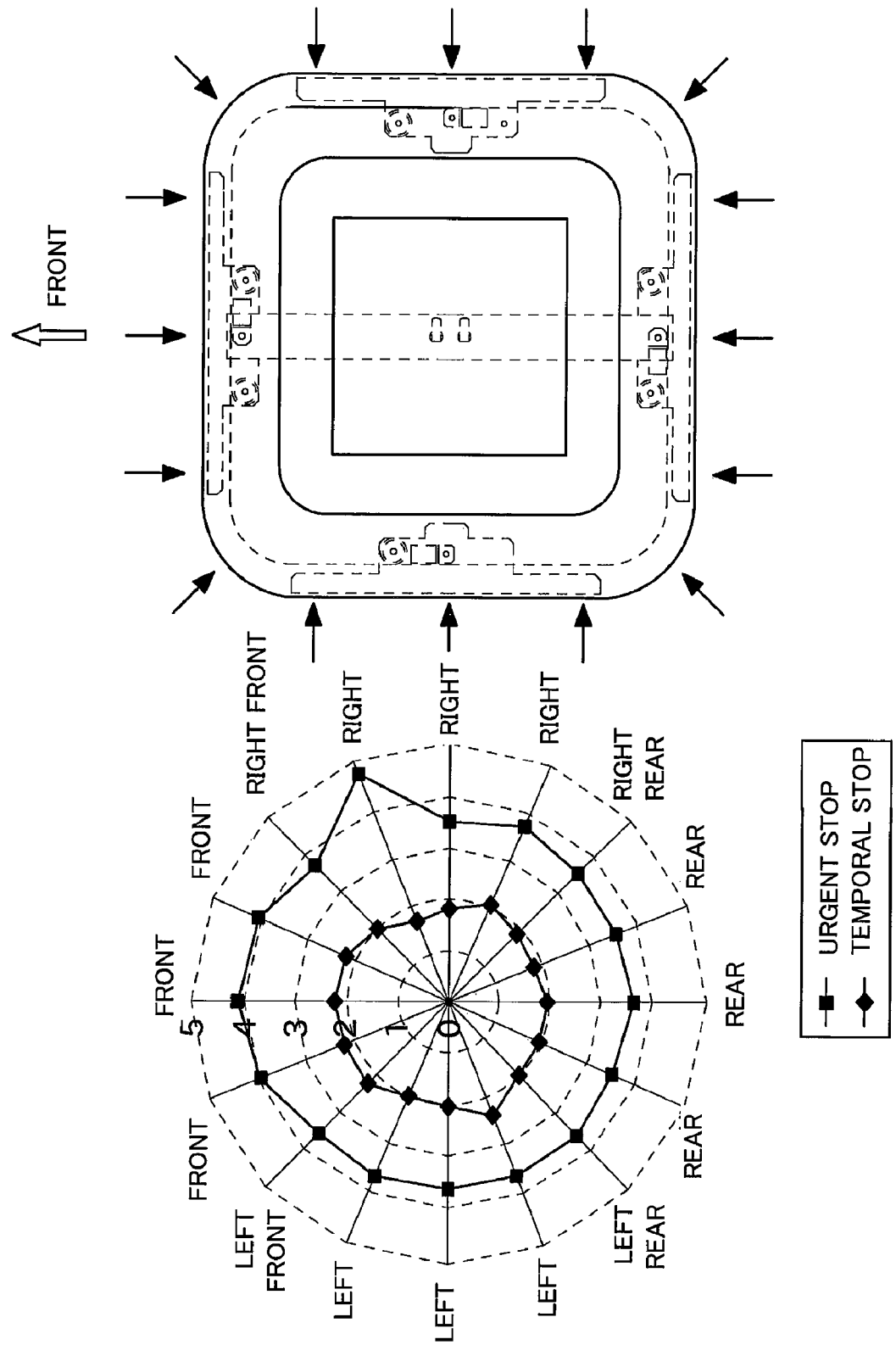
FIG. 10 is a graph representing a control state with respect to the impact strength and the impact direction of the time when the autonomous moving apparatus detects an impact.

A quantitative evaluation of the detection results of the first and second switches 71 and 72 of the time when the autonomous moving apparatus 3 of the present preferred embodiment makes contact with the obstacle will be described with reference to FIG. 10. The drawing on the left side of FIG. 10 is a graph representing the intensity of the impact with respect to each direction in which the autonomous moving apparatus 3 has made contact with the obstacle at the time when the apparatus 3 is urgently stopped or temporarily stopped. The drawing on the right side of FIG. 10 is a model that corresponds to the graph and illustrates a position at which the autonomous moving apparatus 3 has made contact with the obstacle. Directions of arrows of the model respectively correspond to the directions of the graph.

As represented in the graph of FIG. 10, the magnitude of the impact of the obstacle at the time when the drive unit is controlled to temporarily stop is substantially constant in all directions. In other words, the magnitude of the impact detected by the first proximity switch 71 is substantially constant in all directions, and the impact detection accuracy depending on a portion where the cover 41 has made contact with the obstacle or the like is substantially constant. Similarly, the magnitude of the impact at the time when the drive unit is controlled to urgently stop is substantially constant in all directions. Further, the autonomous moving apparatus 3 is controlled to urgently stop only when the detected impact is greater than the impact detected when the apparatus 3 is controlled to temporarily stop. Thus, a proper control can be implemented in accordance with the magnitude of the detected impact. Accordingly, the quantitative evaluation of FIG. 10 represents that, with the configuration of the present preferred embodiment, disproportion in the impact detection accuracy can be reduced regardless of the portion where the cover 41 has made contact with the obstacle or the like, and that the drive unit can be properly controlled in accordance with the magnitude of a desired impact by properly optimizing the sizes (the radius or the dimension) of the first and second detection bodies 71B and 72B.

As described above, the autonomous moving apparatus 3 of the present preferred embodiment preferably includes the vehicle 40, the cover 41, the first proximity switch 71, and the electronic control device 32. The vehicle 40 includes the drive unit. The cover 41 partially covers the side surfaces of the vehicle 40 and is attached to the vehicle 40 such that the cover 41 can be displaced with respect to the vehicle 40. The first proximity switch 71 is arranged at the central portion of the vehicle 40 and outputs the on/off detection signals when the cover 41 is displaced by the prescribed value with respect to the vehicle 40. The electronic control device 32 controls the drive unit in accordance with the detection signals output from the first proximity switch 71.

Thus, when the autonomous moving apparatus 3 makes contact with the obstacle or the like, for example, the cover 41 is displaced with respect to the vehicle 40 by the external forces applied to the autonomous moving apparatus 3. By detecting the relative displacement by the first proximity switch 71 arranged at the central portion of the vehicle 40, the relative displacement of the cover 41 can be evenly detected in all directions. Accordingly, it is not necessary to provide a detection unit with respect to each direction on the assumption of omni-directional contacts with the obstacles or the like, thereby reducing the number of detection units. Moreover, the omni-directional contacts or collisions can be detected by using the reasonable, simply-configured, binary proximity switch 71 that can be turned on and off. Further, since the first proximity switch 71 is arranged at the central portion, wiring arrangement or the like can be simplified, and the configuration arranged to detect the contacts and the collisions can also be simplified.

In the autonomous moving apparatus 3 of the present preferred embodiment, the cover 41 is configured to be symmetric across the portion where the first proximity switch 71 is arranged.

Accordingly, since the cover 41 is symmetric, a disproportion of the relative displacement amount can be reduced regardless of the portion where the cover 41 has made contact with the obstacle or the like. As a result, the contacts and the collisions with respect to the autonomous moving apparatus 3 can be evenly detected in all directions, thereby improving the detection accuracy.

Further, the autonomous moving apparatus 3 of the present preferred embodiment preferably includes the ball plungers 62 arranged to restrict the movement in the upper direction of the cover 41 with respect to the vehicle 40.

Therefore, when the obstacle or the like makes contact with the cover 41 obliquely from a lower side, and when the cover 41 is pressed to move obliquely upward, the movement in the upper direction can be restricted by the ball plungers 62, and thus the amount of displacement of the cover 41 in the horizontal direction can be sufficiently secured. Accordingly, by detecting the horizontal movement of the cover 41, the first proximity switch 71 can accurately detect the impact and the contact even when the obstacle makes contact with the cover 41 obliquely from the lower side, for example.

In the autonomous moving apparatus 3 of the present preferred embodiment, the cover 41 is attached to the vehicle 40 via the GelBushes 61 arranged to support the cover 41 such that the cover 41 can be displaced in accordance with the external forces.

Thus, when the autonomous moving apparatus 3 has made (is in) contact with the obstacle or the like, the cover 41 is displaced with respect to the vehicle 40 in accordance with the external forces applied to the cover 41 of the autonomous moving apparatus 3. Accordingly, situations where an impact is detected even though the impact of the contact made by the obstacle is small enough to be ignored or where the impact is not detected even though the impact of the contact made by the obstacle is great, for example, can be prevented, thereby implementing accurate detection by the detection unit in accordance with the impact.

The autonomous moving apparatus 3 of the present preferred embodiment further includes the second proximity switch 72 having the detection characteristics that are different from that of the first proximity switch 71. The second proximity switch 72 outputs the off detection signal when the cover 41 is displaced with respect to the vehicle 40 by the value that is greater than the prescribed value of the first proximity switch 71. The electronic control device 32 controls the electric motors 12 (drive unit) based on the on/off signals output from the first and second proximity switches 71 and 72.

Thus, the magnitude of the contact can be detected in three stages (that is, no contact, slight contact, and intense contact). Moreover, by controlling the drive unit in accordance with the magnitude (intensity) of the detected contact, phased stop operation and avoidance operation or the like can be controlled in accordance with the magnitude (intensity) of the detected contact.

The preferred embodiments of the present invention have been described above, however, the present invention is not limited to those preferred embodiments and may be modified in various ways as described below, for example.

In the above preferred embodiments, the capacitance proximity switch is preferably used as the detection unit (i.e., the first proximity switch 21, the second proximity switch 22, the first proximity switch 71, and the second proximity switch 72), however, switches of other types may be used. For example, a proximity switch of induction type, ultrasonic type, photoelectric type, and magnetic type, for example, may be used as the detection unit. Moreover, the detection device arranged to detect the relative displacement of the vehicle 10 (vehicle 40) and the cover 11 (cover 41) preferably adopts a non-contact type, but a contact-type detection device may also be used.

In the first and second preferred embodiments, the first and second proximity switches 21 and 22 are preferably attached to the upper surface side of the vehicle 10 (the frame 10A). In place of this configuration, the cover may be attached such that the cover covers the lower surface side of the frame 10A in a range in which the cover does not interfere with the omni-wheels 13, and the first and second proximity switches 21 and 22 may be attached to the lower surface side of the frame 10A.

In the first and second preferred embodiments, the round-shaped detection bodies 21B and 22B are used, however, an oval shape, a rectangular shape, or any other desirable shape, for example, may be adopted. In such cases, directional characteristics can be gained in the displacement detecting direction.

In the first and second preferred embodiments, the insulators 20 are used to support the cover 11 such that the cover can be displaced with respect to the vehicle 10, however, a damper or the like may be used in place of the insulator.

In the third preferred embodiment, both the first and second proximity switches 71 and 72 are preferably arranged at the central portion of the vehicle 40, however, one of the switches may be arranged at the central portion of the vehicle, and the other may be arranged away from the central portion of the vehicle. Any one of the first and second proximity switches 71 and 72 may be omitted from the configuration of the third preferred embodiment, and the contact and the impact with the obstacle or the like with respect to the autonomous moving apparatus 3 may be detected by a single proximity switch.

In the above preferred embodiments, one or two proximity switch(es) is preferably used, but more than three proximity switches may be used. In such a case, by providing each of the switches with different detection characteristics, the magnitude (intensity) of the contact with the obstacles or the like may be further divided and detected in multiple-stages.

In the above preferred embodiments, a Normal Open (NO) type detection unit, which turns on the output when the detection body is in the detection area, is preferably used as the detection unit (the first proximity switch 21, the second proximity switch 22, the first proximity switch 71, and the second proximity switch 72), however, such configuration may be properly modified, and a Normal Close (NC) type detection unit, which turns on the output when the detection body is not in the detection area, may be used, for example.

In the above preferred embodiments, when the contact with the obstacle or the like is detected, the apparatus is preferably stopped (temporarily or urgently), however, in place of such stop operations, an avoidance operation that moves the apparatus away from the contacted obstacle or the like may also be performed, for example.

In the above preferred embodiments, the omni-wheels 13 capable of omni-directional movement are preferably used as the wheel, however, a normal wheel (such as a steering wheel and a drive wheel, for example) may also be used.

While the present invention has been described with respect to preferred embodiments thereof, it will be apparent to those skilled in the art that the disclosed invention may be modified in numerous ways and may assume many preferred embodiments other than those specifically set out and described above. Accordingly, the appended claims are intended to cover all modifications of the present invention that fall within the true spirit and scope of the present invention.

What is claimed is:

1. An autonomous moving apparatus comprising:
a vehicle provided with a drive unit;
a cover that is attached to the vehicle such that the cover either entirely or partially covers side, upper, and lower surfaces of the vehicle, and the cover is arranged to be displaced with respect to the vehicle;
a detection unit arranged to output detection signals in accordance with relative displacement generated between at least one of the upper and lower surfaces of the vehicle and the cover facing at least one of the upper and lower surfaces; and
a control unit arranged to control the drive unit in accordance with the detection signal output from the detection unit;
wherein the detection unit is a first detection unit, the autonomous moving apparatus further comprising a second detection unit provided with detection characteristics that are different from detection characteristics of the first detection unit; wherein
the first detection unit is turned on or off when the cover is displaced by a prescribed value;
the second detection unit is turned on or off when the cover is displaced by a value that is greater than the prescribed value; and
the control unit controls the drive unit in accordance with on or off signals output from the first detection unit and the second detection unit.

2. The autonomous moving apparatus according to claim 1, wherein the cover is attached to the vehicle via supporting members arranged to support the cover.

3. The autonomous moving apparatus according to claim 2, wherein the supporting members support the cover such that the cover can be displaced in accordance with an externally-applied force.

4. The autonomous moving apparatus according to claim 1, wherein the detection unit includes:
a detection body attached to an inner surface of the cover facing at least one of the upper and lower surfaces of the vehicle; and
a sensor that is attached to a position that faces the detection body arranged on at least one of the upper and lower surfaces of the vehicle, the sensor being arranged to contactlessly detect an absence and/or a presence of the detection body.

5. An autonomous moving apparatus comprising:
a vehicle provided with a drive unit;
a cover that is attached to the vehicle such that the cover either entirely or partially covers side, upper, and lower surfaces of the vehicle, and the cover can be displaced with respect to the vehicle;
a detection unit that is arranged at a central portion of the vehicle and arranged to output on or off detection signals when the cover is displaced with respect to the vehicle by a prescribed value; and
a control unit arranged to control the drive unit in accordance with the detection signal output from the detection unit;
wherein the detection unit is a first detection unit, the autonomous moving apparatus further comprising a second detection unit provided with detection characteristics that are different from detection characteristics of the first detection unit; wherein
the second detection unit outputs on or off detection signals when the cover is displaced with respect to the vehicle by a prescribed value that is different from a prescribed value of the first detection unit; and
the control unit controls the drive unit in accordance with the on or off signals output from the first detection unit and the second detection unit.

6. The autonomous moving apparatus according to claim 5, wherein the cover is anteriorly-posteriorly and bilaterally symmetric across a portion where the detection unit is arranged.

7. The autonomous moving apparatus according to claim 5, wherein the cover includes a restriction member arranged to restrict the movement of the cover in an upper direction with respect to the vehicle.

* * * * *